US011147001B2

(12) United States Patent
Choi et al.

(10) Patent No.: US 11,147,001 B2
(45) Date of Patent: Oct. 12, 2021

(54) METHOD AND DEVICE FOR PERFORMING HANDOVER IN WIRELESS COMMUNICATION SYSTEM

(71) Applicant: Samsung Electronics Co., Ltd., Suwon-si (KR)

(72) Inventors: Jihyeon Choi, Suwon-si (KR); Jongho Park, Seoul (KR); Sangyeon Won, Seoul (KR); Hanseok Kim, Seoul (KR); Daewoo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/630,672

(22) PCT Filed: May 25, 2018

(86) PCT No.: PCT/KR2018/005944
§ 371 (c)(1),
(2) Date: Jan. 13, 2020

(87) PCT Pub. No.: WO2019/013446
PCT Pub. Date: Jan. 17, 2019

(65) Prior Publication Data
US 2021/0120471 A1   Apr. 22, 2021

(30) Foreign Application Priority Data

Jul. 13, 2017  (KR) .................. 10-2017-0089227

(51) Int. Cl.
*H04W 36/00* (2009.01)
*H04W 84/12* (2009.01)

(52) U.S. Cl.
CPC ... *H04W 36/0094* (2013.01); *H04W 36/0058* (2018.08); *H04W 36/00837* (2018.08); *H04W 84/12* (2013.01)

(58) Field of Classification Search
CPC ......... H04W 36/0094; H04W 36/0058; H04W 36/00837; H04W 84/12
See application file for complete search history.

(56) References Cited

U.S. PATENT DOCUMENTS 8,437,758 B2 * 5/2013 Zuniga ............... H04W 36/005
455/437
9,572,071 B2 * 2/2017 Capdevielle .... H04W 36/00835
(Continued)

FOREIGN PATENT DOCUMENTS

CN   104105137 A   10/2014
CN   104320817 A   1/2015
(Continued)

OTHER PUBLICATIONS

IEEE Standards Association, "Part 11: Wireless LAN Medium Access Control (MAC) and Physical Layer (PHY) Specifcations", IEEE Computer Society, Mar. 29, 2012.
(Continued)

*Primary Examiner* — Marisol Figueroa
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments of the present disclosure, a device of a terminal in a wireless communication system can include at least one transceiver and at least one processor operationally coupled with at least one transceiver. At least one processor can receive configuration information from a first network node for a first radio access technology (RAT), measure a first quality for a first signal of the first RAT and a second quality for a second signal of a second RAT on the basis of the received configuration information, and determine, whether a handover to a second network for the
(Continued)

second RAT is performed, on the basis of the measured first quality or the measured second quality. The configuration information can include parameters for the handover between the first RAT and the second RAT.

20 Claims, 9 Drawing Sheets

(56) References Cited

U.S. PATENT DOCUMENTS

| | | | |
|---|---|---|---|
| 2006/0205407 A1* | 9/2006 | Jagadeesan | H04W 36/30 455/436 |
| 2009/0280812 A1 | 11/2009 | Cheng et al. | |
| 2013/0170389 A1 | 7/2013 | Jee et al. | |
| 2014/0233386 A1 | 8/2014 | Jamadagni et al. | |
| 2015/0201343 A1 | 7/2015 | Jung et al. | |
| 2015/0215839 A1 | 7/2015 | Johansson et al. | |
| 2015/0289186 A1 | 10/2015 | Stalnacke et al. | |
| 2016/0014664 A1 | 1/2016 | Singh et al. | |
| 2016/0080981 A1 | 3/2016 | Wang et al. | |
| 2016/0088527 A1* | 3/2016 | Wolff | H04W 36/0055 455/436 |
| 2016/0183131 A1 | 6/2016 | Khawer et al. | |
| 2017/0019819 A1 | 1/2017 | Vang et al. | |
| 2017/0070923 A1 | 3/2017 | Li et al. | |
| 2017/0118690 A1* | 4/2017 | Patel | H04W 36/0061 |
| 2017/0171782 A1 | 6/2017 | Mohamed et al. | |
| 2017/0195930 A1 | 7/2017 | Tomici et al. | |

FOREIGN PATENT DOCUMENTS

| | | |
|---|---|---|
| CN | 105163355 A | 7/2015 |
| CN | 104796955 A | 12/2015 |
| CN | 105517079 A | 4/2016 |
| CN | 106165490 A | 11/2016 |
| CN | 106470444 A | 3/2017 |
| GN | 104754661 A | 7/2015 |
| KR | 10-2010-0070120 A | 6/2010 |
| KR | 10-2012-0026441 A | 3/2012 |
| KR | 10-2015-0036097 A | 4/2015 |
| KR | 10-2015-0120485 A | 10/2015 |
| KR | 10-2016-0104016 A | 9/2016 |
| WO | 2015/127241 A1 | 8/2015 |

OTHER PUBLICATIONS

3GPP TR 37.834. 3rd Generation Partnership Project; Technical Specification Group Radio Access Network; Study on Wireless Local Area Network (WLAN)—3GPP radio interworking (Release 12). Dec. 2013. pp. 1-17.
Kassar, Meriem et al. A Mobile-controlled Handover Management Scheme in a Loosely-coupled 3G-WLAN Interworking Architecture. University Pierre & Marie Curie-Paris. Paris, France. pp. 1-5.
European Search Report dated Mar. 19, 2020, Issued in European Application No. 18 83 2183.
3 GPP TSG RAN WG2 Meeting #91bis. Catt. RRM Measurements for WLAN. R2-154071. Malmo, Sweden, Oct. 5-9, 2015. pp. 1-7.
Statistical Learning and Multiple Linear Regression Model for Network Selection using MIH. Rahil, Ahmad et al. LE21 Laboratory—UMR CNRS 6306, University of Burgundy Dijon, France. Atieh, Mirna. Computer Science Department Faculty of Economic Sciences and Administration Lebanese University, Beirut, Lebanon. Fouladkar, Ali, Cerag Laboratory—UMR CNRS 5820, University of Grenoble Alpes (UPMF) Grenoble, France.
European Office Action dated May 17, 2021, issued in European Application No. 18832183.0.
Indian Office Action dated Apr. 27, 2021, issued in Indian Application No. 202037005590.
Chinese Office Action dated May 10, 2021, issued in Chinese Application No. 201880046725.0.
"LTE Handover performance Evaluation Based on Power Budget Handover Algorithm", Chavarria, Universitat Politècnica de Catalunya, Feb. 2024.
Korean Office Action dated Jul. 16, 2021, in Korean Application No. 10-2017-0089227.

* cited by examiner

METHOD AND DEVICE FOR PERFORMING HANDOVER IN WIRELESS COMMUNICATION SYSTEM

BACKGROUND ART

The disclosure generally relates to a wireless communication system and, more particularly, to a method and a device for performing a handover in a wireless communication system.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System.'

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A handover technology of a wireless local area network (WLAN) is a scheme in which a terminal (station) searches for adjacent access points (APs), measures a reception signal, and determines a target AP, so as to attempt a handover. However, the terminal attempting a handover knows neither the channel for the handover nor APs existing in the channel, and thus scans all channels.

The terminal determines whether to use wireless-fidelity (Wi-Fi) or cellular communication by using the strength of a signal from an AP. For example, when the terminal is connected to the AP, the terminal determines whether to maintain a connection with the AP or perform a handover to a base station supporting cellular communication. Accordingly, a situation in which the terminal performs the handover to the base station may occur despite a low quality of the base station. In addition, the terminal may not perform the handover to a radio access technology (RAT) which can provide better service in a state where cell coverage of the base station and Wi-Fi network coverage of the AP overlap each other. In other words, the terminal takes only the signal of the AP into account in determining whether to perform the handover, and is unable to consider, for the handover, a difference between service qualities of various other Wi-Fi and RAT communication systems.

DISCLOSURE OF INVENTION

Technical Problem

Based on the discussion as described above, the disclosure provides a method and a device for performing a handover (HO) in a wireless communication system.

In addition, the disclosure provides a method and a device for performing a handover between different radio access technologies (RATs) in a wireless communication system.

In addition, the disclosure provides a method and a device for performing a handover by comparing a channel quality between different RATs in a wireless communication system.

In addition, the disclosure provides a method and a device for obtaining parameters for measuring a channel quality of each of RATs in a wireless communication system.

In addition, the disclosure provides a method and a device for supporting a handover between a cellular network and a wireless local area network (WLAN) network in consideration of a channel quality of the cellular network in a wireless communication system.

According to various embodiments of the disclosure, a device of a terminal in a wireless communication system may include at least one transceiver and at least one processor operatively coupled with the at least one transceiver. The at least one processor may receive configuration information from a first network node for a first radio access technology (RAT), measure a first quality for a first signal of the first RAT and a second quality for a second signal of a second RAT, based on the received configuration information, and determine whether to perform a handover to a second network node for the second RAT, based on the measured first quality or the measured second quality, and the configuration information may include parameters for the handover between the first RAT and the second RAT.

According to various embodiments of the disclosure, a device of a network node in a wireless communication system may include at least one transceiver and at least one processor operatively coupled with the at least one transceiver. The at least one processor may receive a message for requesting configuration information from a terminal connected to the network node and transmit the configuration information to the terminal, and the configuration information may include parameters for a handover between a first RAT for the network node and a second RAT for another network node, a network of which is different from a network of the network node.

According to various embodiments of the disclosure, an operation method of a terminal in a wireless communication system may include: receiving configuration information from a first network node for a first RAT; measuring a first quality for a first signal of the first RAT and a second quality for a second signal of a second RAT, based on the received configuration information; and determining whether to perform a handover to a second network node for the second RAT, based on the measured first quality or the measured second quality, and the configuration information may include parameters for the handover between the first RAT and the second RAT.

According to various embodiments of the disclosure, an operation method of a network node in a wireless communication system may include: receiving a message for requesting configuration information from a terminal connected to the network node; and transmitting the configuration information to the terminal, and the configuration information may include parameters for a handover between a first RAT for the network node and a second RAT for another network node, a network of which is different from a network of the network node.

A method and a device according to various embodiments of the disclosure may compare a service quality between a Wi-Fi access point (AP) and a cellular base station, so as to select an optimal radio access technology (RAT) and perform a handover.

Effects which can be acquired by the disclosure are not limited to the above described effects, and other effects that have not been mentioned may be clearly understood by those skilled in the art from the following description.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal or similar to the contextual meanings in the relevant field of technology, and are not to be interpreted to have ideal or excessively formal meanings unless clearly defined in the disclosure. In some cases, even the terms defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a method and a device for performing a handover in a wireless communication system. Specifically, the disclosure relates to a technology for measuring each of channel qualities between different radio access networks (RATs) in a wireless communication system and comparing the channel qualities, so as to perform a handover to an access point (AP) of a wireless local area network (WLAN) or an eNodeB (eNB) of a network node (e.g., long term evolution (LTE)) supporting an RAT which provides an optimal service.

In the following description, terms referring to information (e.g., a parameter, a measurement value, and information element (IE)), terms referring to network entities, terms referring to components of a device, and the like are exemplified for convenience of description. Accordingly, the disclosure is not limited to the following terms and other terms having the same technical meaning may be used.

In addition, although the disclosure describes various embodiments by using terms used in some communication standards (e.g., 3rd Generation Partnership Project (3GPP)), the embodiments are only an example for description. Various embodiments of the disclosure may be easily modified and applied to other communication systems.

Figure 1:
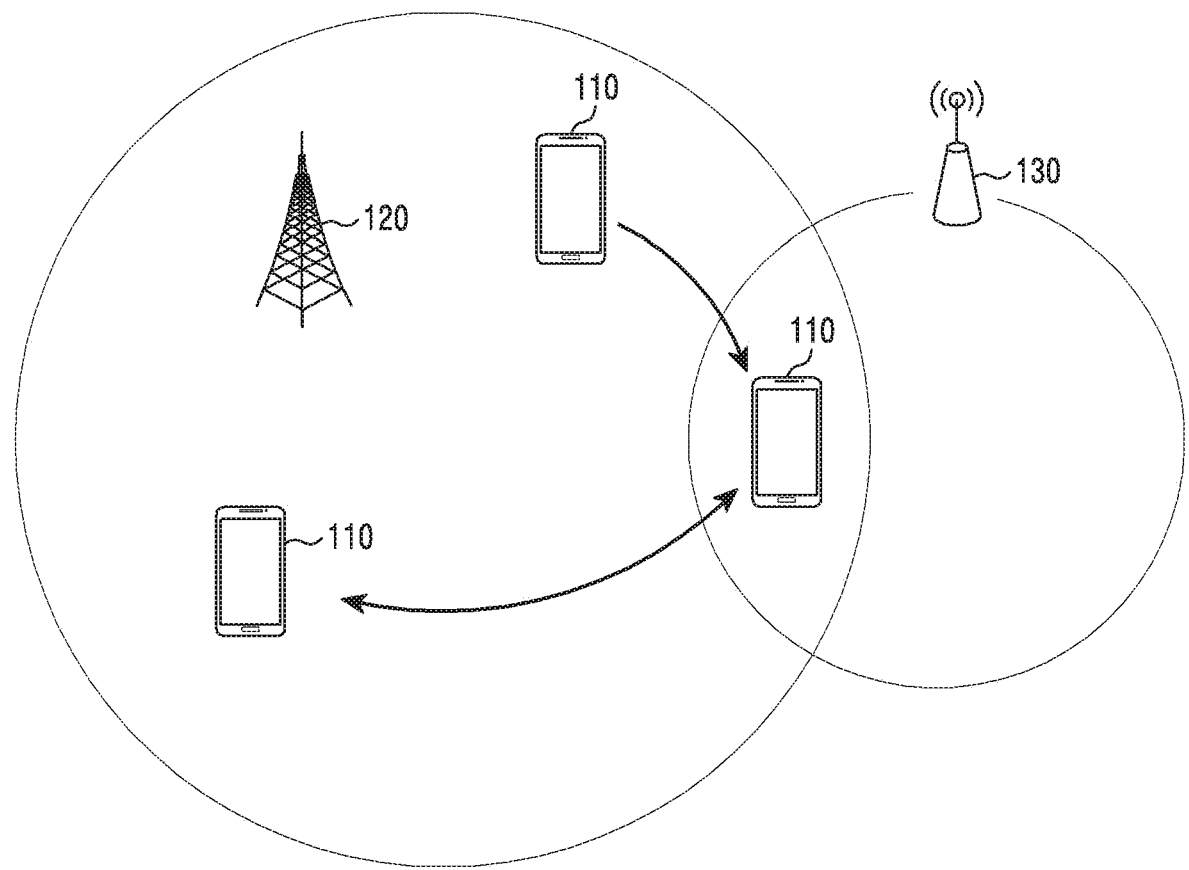
FIG. 1 illustrates a wireless communication system according to various embodiments of the disclosure.

FIG. 1 illustrates a wireless communication system according to various embodiments of the disclosure. FIG. 1 illustrates a terminal 110, a first network node 120, and a second network node 130 as a part of nodes using a wireless channel in a wireless communication system.

Referring to FIG. 1, a wireless communication environment 100 may include the terminal 110, the first network node 120, and the second network node 130. A situation in which the terminal 110 is located within a coverage of the first network node 120 and the second network node 130 is described.

The terminal 110 is a device used by a user and communicates with a base station 120 through a wireless channel. In some cases, at least one terminal 110 may be operated without user involvement. For example, the terminal 110 is a device for performing machine type communication (MTC) and may not be carried by a user. The terminal 110 may refer to a "user equipment (UE)," a "mobile station," a "subscriber station," a "remote terminal," a "wireless terminal," and an "electronic device" other than a terminal, a "user device," or other terms having equivalent technical meanings. A terminal (e.g., the terminal 110) according to various embodiments of the disclosure may include at least one of, for example, a smart phone, a tablet Personal Computer (PC), a mobile phone, a video phone, an electronic book reader, a desktop PC, a laptop PC, a netbook computer, a workstation, a server, a PDA, a Portable Multimedia Player (PMP), an MP3 player, a medical device, a camera, and a wearable device.

The first network node 120 is a network infrastructure which provides wireless access in a cellular communication scheme to a terminal within a coverage. The coverage may be defined as a predetermined geographic area, based on a distance at which the first network node 120 can transmit a signal. The first network node 120 may provide a service to terminals (e.g., the terminal 110) within a coverage (or a cell). The terminal 110 may be connected to the internet network via a mobile communication service provider, through the first network node 120. The wireless access may mean access to a cellular network or a mobile network. The first network node 120 may be distinguished from the second network node 130 described below as a network node supporting cellular communication. For example, the first network node may refer to an "evolved NodeB (eNB)," a "$5^{th}$-generation node," a "5G NodeB, (NB)," a "transmission/reception point (TRP)" or other terms having equivalent technical meanings. The first network node 120 may communicate with at least one terminal within a coverage. Hereinafter, for convenience of description, the first network node 120 is described using an eNB supporting a long term evolution (LTE) communication system as an example, but is not limited thereto.

The second network node 130 is a network infrastructure which provides wireless access in a non-cellular communication scheme to a terminal within a coverage. The second network node 130 may be a network node which provides wireless access to a terminal in coverage of an unlicensed band. The second network node 130 may be a device which supports a wireless local area network (WLAN) communication system (e.g., wireless-fidelity (Wi-Fi). Hereinafter, for convenience of description, the second network node 130 is described using an AP supporting a Wi-Fi communication system as an example, but is not limited thereto.

Figure 2:
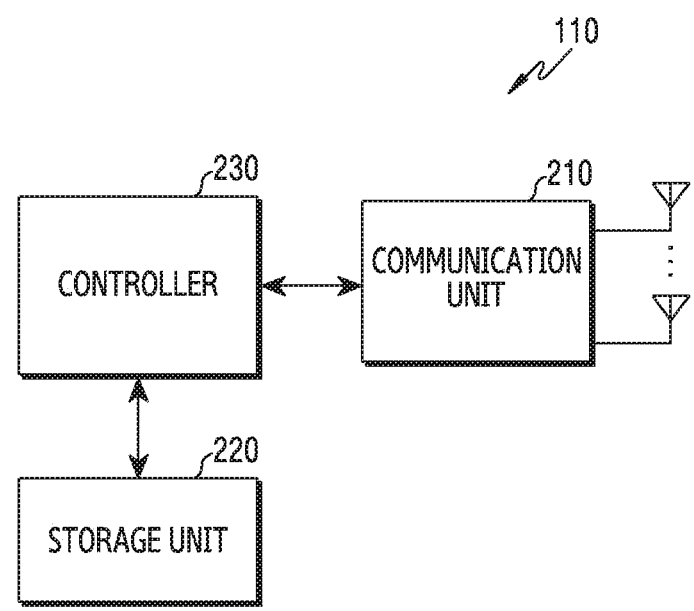
FIG. 2 illustrates an example of a configuration of a terminal in a wireless communication system according to various embodiments of the disclosure.

FIG. 2 illustrates an example of a configuration of a terminal in a wireless communication system according to various embodiments of the disclosure. The configuration illustrated in FIG. 2 may be understood as a configuration of the terminal 110. The term "~unit" or "~er" used hereinafter may refer to a unit for processing at least one function or operation and may be implemented by hardware, software, or a combination of hardware and software.

Referring to FIG. 2, the terminal includes a communication unit 210, a storage unit 220, and a controller 230. The communication unit 210 performs functions for transmitting and receiving a signal through a wireless channel. For example, the communication unit 210 performs a function of conversion between a baseband signal and a bit stream according to a physical layer standard of a system. For example, when data is transmitted, the communication unit 210 generates complex symbols by encoding and modulating a transmission bit stream. In addition, when data is received, the communication unit 210 restores a reception bit stream by demodulating and decoding a baseband signal. In addition, the communication unit 210 up-converts a baseband signal into a RF band signal and transmits the same through an antenna, and down-converts an RF band signal received through an antenna into a baseband signal. For example, the communication unit 210 may include a transmission filter, a reception filter, an amplifier, a mixer, an oscillator, a DAC, an ADC, and the like.

In addition, the communication unit 210 may include a plurality of transmission and reception paths. Further, the communication unit 210 may include at least one antenna array including a plurality of antenna elements. In terms of hardware, the communication unit 210 may be configured by a digital circuit and an analog circuit (e.g., a radio frequency integrated circuit (RFIC)). The digital circuit and the analog circuit may be implemented as one package. In addition, the communication unit 210 may include a plurality of RF chains. Furthermore, the communication unit 210 may perform beamforming.

In addition, the communication unit 210 may include different communication modules so as to process signals of different frequency bands. The communication unit 210 may include a communication module for processing signals of a cellular communication scheme. For example, the communication unit 210 may include a communication module for accessing a cellular network of an LTE communication system. Furthermore, the communication unit 210 may include a communication module for processing signals of a non-cellular communication scheme. For example, the communication unit 210 may include a Wi-Fi module or a Wi-Fi Gigabyte (WiGig) module. The communication unit 210 may include a plurality of communication modules described to support a plurality of different radio access technologies (RATs). Further, different frequency bands may include a Super High Frequency (SHF) (for example, 2.5 GHz and 5 Ghz) band and a millimeter (mm) wave (for example, 60 GHz) band.

The communication unit 210 transmits and receives a signal as described above. Accordingly, all or a part of the communication unit 210 may be referred to as a "transmitter," "receiver" or "transceiver." In addition, the transmission and reception performed through a wireless channel, which is described in the following description, may be understood to mean that the above-described processing is performed by the communication unit 210.

The storage unit 220 stores data such as a basic program, an application program, and configuration information for an operation of the terminal 110. The storage unit 220 may be configured as a volatile memory, a non-volatile memory, or a combination of a volatile memory and a non-volatile memory. The storage unit 220 provides stored data at the request of the controller 230. The storage unit 230 may include a buffer. According to various embodiments, the storage 220 may store a plurality of transmission blocks generated by the controller 230.

The controller 230 controls overall operations of the terminal 110. For example, the controller 230 transmits and receives a signal through the communication unit 210. Further, the control unit 230 records data in the storage unit 220 and reads the recorded data. The controller 230 may perform functions of a protocol stack required by a communication standard. To this end, the controller 230 may include at least one processor or a microprocessor, or may be a part of the processor. In addition, a part of the communication unit 210 and the controller 230 may be referred to as a communication processor (CP). In particular, according to various embodiments, the controller 230 may measure a quality of a reception signal, determine whether to perform a handover, and perform the handover, based on configuration information received through the communication unit 210. For example, the controller 230 may control the terminal to perform operations according to various embodiments described below.

Figure 3:
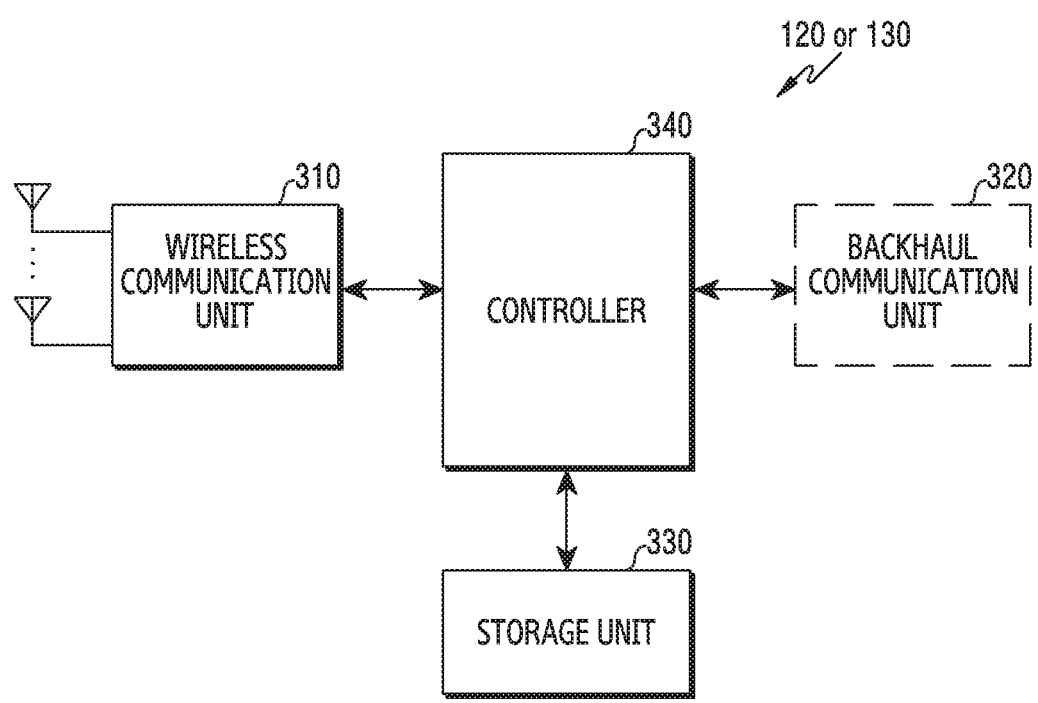
FIG. 3 illustrates an example of a configuration of a network node in a wireless communication system according to various embodiments of the disclosure.

FIG. 3 illustrates an example of a configuration of a network node in a wireless communication system according to various embodiments of the disclosure. The configuration illustrated in FIG. 3 may be understood as the configuration of the first network node 120 or the second network node 130. The term " . . . unit" or the ending of a word, such as " . . . or," " . . . er," or the like may indicate a unit of processing at least one function or operation, and this may be implemented by hardware, software, or a combination of hardware and software.

Referring to FIG. 3, the first network node 120 may include a wireless communication unit 310, a backhaul communication unit 320, a storage unit 330, and a controller 340. The second network node 130 may include the wireless communication unit 310, the storage unit 330, and the controller 340.

The wireless communication unit 310 performs functions for transmitting and receiving a signal through a wireless channel. For example, the wireless communication unit 310 performs a function of conversion between a baseband signal and a bit stream according to a physical layer standard of a system. For example, when data is transmitted, the wireless communication unit 310 generates complex symbols by encoding and modulating a transmission bit stream. In addition, when data is received, the wireless communication unit 310 restores a reception bit stream by demodulating and decoding a baseband signal. In addition, the wireless communication unit 310 up-converts a baseband signal into a radio-frequency (RF) band signal and transmits the same through an antenna, and down-converts an RF band signal received through an antenna into a baseband signal.

To this end, the wireless communication unit 310 may include a transmission filter, a reception filter, an amplifier, a mixer, an oscillator, a digital-to-analog convertor (DAC), an analog-to-digital convertor (ADC), and the like. In addition, the communication unit 310 may include a plurality of transmission and reception paths. Further, the wireless communication unit 310 may include at least one antenna array including a plurality of antenna elements. In terms of hardware, the wireless communication unit 310 may include a digital unit and an analog unit, and the analog unit may include a plurality of sub-units according to operation power, operation frequency, and the like.

The communication unit 310 transmits and receives a signal as described above. Accordingly, all or a part of the wireless communication unit 310 may be referred to as a "transmitter," "receiver," or "transceiver." In addition, the transmission and reception performed through a wireless channel, which is described in the following descriptions, may be understood to mean that the above-described processing is performed by the wireless communication unit 310.

When a network node is a node on a cellular network (or a mobile network), the wireless communication unit 310 may transmit and receive a signal on the cellular network (e.g., an LTE network). The cellular network refers to a wireless network allocated to a specific network service provider and provided from the corresponding service provider. The cellular network may refer to a licensed band. Meanwhile, when the network node is a node on a non-cellular network, the wireless communication unit 310 may transmit a signal on a network of a WLAN. The network of the WLAN may refer to an unlicensed band.

When the network node is a node on a mobile network, the network node may include the backhaul communication unit 320. The backhaul communication unit 320 provides an interface for performing communication with other nodes within a network. That is, the backhaul communication unit 320 converts a bit stream transmitted from the first network node 120 to another node, for example, another access node, another base station, an upper node, a core network, etc., into a physical signal, and converts a physical signal received from another node to a bit stream. Meanwhile, when the network node is a node on a WLAN, the network node may or may not include the backhaul communication unit 320.

The storage unit 330 stores data such as a basic program, an application program, and configuration information for an operation of the network node. The storage unit 330 may be configured as a volatile memory, a non-volatile memory, or a combination of a volatile memory and a non-volatile memory. Further, the storage unit 330 provides stored data at the request of the controller 340.

The controller 340 controls overall operations of the network node (e.g., the first network node 120 or the second network node 130). For example, the controller 340 transmits and receives a signal through the wireless communication unit 310 or the backhaul communication unit 320. Further, the controller 340 records data in the storage unit 330 and reads the recorded data. The controller 340 may perform functions of a protocol stack required by a communication standard. To this end, the controller 340 may include at least one processor. According to various embodiments, the controller 340 may include a handover configuration unit. The handover configuration unit may provide configuration information related to measurement for a handover to a terminal through the wireless communication unit 310. The handover configuration unit is an instruction set or code stored in the storage unit 330, and may be an instruction/code at least temporarily residing in the controller 340 or a storage space for storing the instruction/code, or may be a part of a circuitry configuring the controller 340. For example, the controller 340 may control the network node to perform operations according to various embodiments described below.

The terminal according to various embodiments of the disclosure may access the first network node (or the second network node) and measure a network quality while receiving a service through the first network node. The network quality includes a channel quality for a WLAN as well as a cellular network. The terminal may perform a handover, based on the measured network quality. For example, the terminal may determine the network node for continuously receiving a service by comparing a channel quality provided through an eNB of LTE and a channel quality provided through an AP of Wi-Fi. Hereinafter, parameters required for a handover and overall operation flows of the terminal and the network node (e.g., eNB or AP) for a handover according to various embodiments are described with reference to FIGS. 4 and 5.

LTE-Wi-Fi Handover (LWHO) and Handover-Related Parameter

Figure 4:
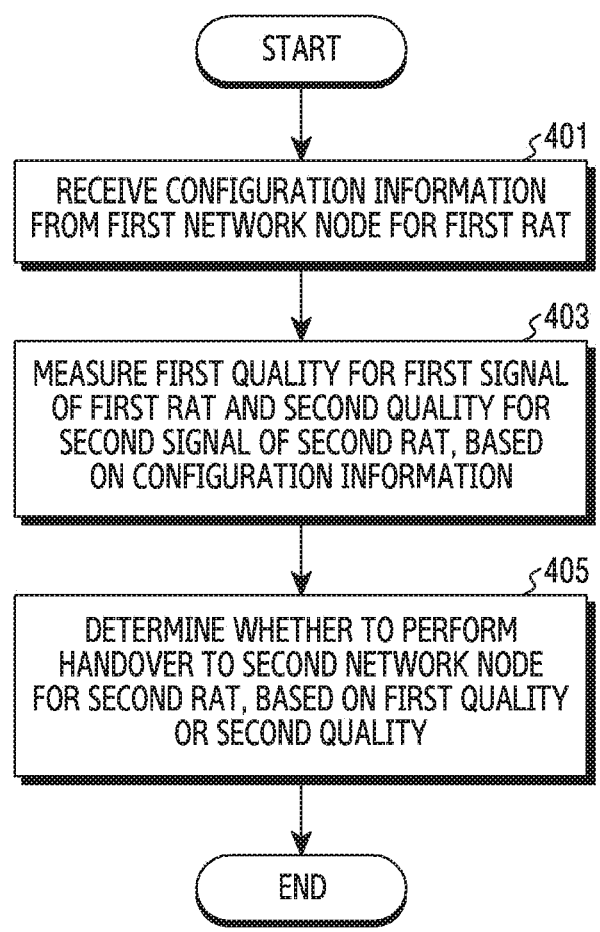
FIG. 4 illustrates an operation flow of a terminal for performing a handover according to various embodiments of the disclosure.

FIG. 4 illustrates an operation flow of a terminal for performing a handover according to various embodiments of the disclosure. FIG. 4 illustrates an operation method of the terminal 110.

Referring to FIG. 4, in operation 401, the terminal may receive configuration information from a first network node for a first RAT. The terminal may receive configuration information including parameters for a handover between the first RAT and a second RAT from the first network node. In some embodiments, the first RAT is a communication technology which provides a cellular network, for example, the first RAT may be a global system for mobile communications (GSM), code division multiple access (CDMA), wide CDMA (WCDMA), high speed packet access (HSPA), HSPA+, worldwide interoperability for microwave access (WiMAX), LTE, LTE-A, or a next-generation wireless communication technology (e.g., 3GPP 5G). The second RAT may be a communication technology which provides a wireless LAN and may be, for example, Wi-Fi. In some other embodiments, the first RAT may be a communication technology for providing a wireless LAN, and the second RAT may be a communication technology for providing a cellular network. Hereinafter, in the disclosure, for convenience of description, the first RAT is described using LTE and the second RAT is described using Wi-Fi (or the first RAT is described using Wi-Fi and the second RAT is described using LTE) as an example, but the disclosure is not limited thereto. In addition, information, parameters, and operations for performing a handover from the first RAT to the second RAT may be equally or similarly applied to the case of performing a handover from the second RAT to the first RAT.

In the case of a handover between LTE and a heterogeneous network, such as a handover between LTE and Wi-Fi, the terminal cannot identify a signal strength of the network since there is no interface interworking between an LTE eNB and a heterogeneous network node. Therefore, the terminal may be required to make a decision of performing a handover. According to various embodiments, the terminal may measure the strength of a signal transmitted from the LTE eNB as well as the strength of a signal transmitted from an AP of the Wi-Fi, in order to determine whether to establish Wi-Fi connection. The terminal may receive configuration information for a handover between LTE and Wi-Fi from the eNB or the AP, for measurement. That is, the terminal may receive the configuration information from the connected first network node.

Although not shown in FIG. 4, the terminal may establish a connection to the first network node in order to receive the configuration information. For example, in the case where the first network node is an eNB, the terminal may be RRC-connected to the eNB through a radio resource control (RRC) connection configuration procedure after a synchronization acquisition procedure and a random-access procedure. For another example, in the case where the first network node is an AP, the terminal may identify the existence of the AP through a scan procedure (e.g., active scan or passive scan), perform an authentication procedure, and then may be connected with the AP.

In some embodiments, the terminal may transmit, to the first network node, a message for requesting configuration information. The terminal may request configuration information from the eNB through RRC signaling or request configuration information from the AP through an action frame. In some other embodiments, the terminal may receive configuration information in response to the connection to the first network node. That is, the first network node may transmit the configuration information to the terminal during the connection procedure with the terminal or in response to the completion of the connection configuration. In some other embodiments, the first network node connected to the terminal may monitor a current state of the terminal, and adaptively transmit configuration information, based on a result (e.g., UE mobility) of the monitoring.

A parameter for a handover may be a parameter for configuring a triggering condition (hereinafter, referred to as an entering condition) for determination of whether to perform a handover, or a release condition (hereinafter, referred to as a leaving condition) for determination of whether to perform a handover. Hereinafter, handover parameters according to various embodiments are described. However, the parameters described below are merely examples, and the configuration information may further include additional parameters.

Trigger parameter: a trigger parameter refers to a parameter indicating a metric for measuring a quality of a channel. For example, the trigger parameter may include at least one of a reference signal received power (RSRP), a reference signal received quality (RSRQ), a received signal strength indicator (RSRI), a signal to interference and noise ratio (SINR), a carrier to interference and noise ratio (CINR), a signal to noise ratio (SNR), error vector magnitude (EVM), a bit error rate (BER), a block error rate (BLER), a frame error rate (FER), and latency. In some embodiments, the trigger parameter may correspond to a "trigger Quantity" in an LTE communication system.

Persistence parameter: a persistence parameter refers to a parameter indicating a duration for determining whether to perform a handover between a first RAT and a second RAT. During the duration, when an entering condition is maintained and a leaving condition is not fulfilled, the terminal may determine whether to perform a handover. In some embodiments, the persistence parameter may correspond to a "time-to-trigger (TTT)" in the LTE communication system. In other words, the persistence parameter means a time for which an event to be described later is maintained.

Event parameter: an event parameter indicates at least one condition (e.g., inequality) for the terminal to determine whether to perform a handover between the first RAT and the second RAT. The condition may be the entering condition or the leaving condition. The entering condition or the leaving condition may be differently configured for each of a plurality of events. In some embodiments, each of the plurality of events may refer to a conditional expression related to at least one measurement of a signal transmitted in an LTE communication scheme or a signal transmitted in a Wi-Fi communication scheme.

Hysteresis value and offset value: a hysteresis value and an offset value refer to a configuration value for determining whether to perform a handover between the first RAT and the second RAT under a condition of a specific event. The hysteresis value is a value configured for the stability of a handover procedure, and may be applied by differently performing addition and subtraction under the entering and leaving conditions. The offset value is a value configured to prevent a ping-pong phenomenon. For example, the offset value may be a value added to or subtracted from a serving cell (e.g., an LTE cell or a Wi-Fi cell) or a target cell in a specific conditional expression.

Threshold value

A threshold value used to determine whether a condition is satisfied in a specific event, and may include a different threshold value for each condition. In addition, configuration information may include a different number of threshold values for each condition. For example, some events may require only an upper or lower limit threshold value in a conditional expression, while other events may require both upper and lower limit threshold values in the conditional expression.

Period parameter: a period parameter means a period for measuring a quality of a channel. In some embodiments, the period parameter may be expressed in the number of measurements. In some other embodiments, the period parameter may be expressed in actual time for measurement.

Interval parameter: an interval parameter means an interval for measuring a quality of a channel.

Unit parameter: a unit parameter means a time unit for acquiring a measurement value. The measurement value means, for example, RSRP, RSRQ, RSSI, latency degree, or loss degree. The unit parameter may be configured as a fixed value (e.g., 1 ms) or adaptively configured.

Filtering coefficient parameter: a filtering coefficient parameter means a coefficient for correcting measurement values between different communication systems. That is, the filtering coefficient parameter may be used as a coefficient for correcting a measurement value difference between the first RAT and the second RAT, for example, in order to compare a value measured through Wi-Fi and a value measured through LTE. In some embodiments, the parameter may not be included.

Measurement object parameter: a measurement object parameter means a list of neighboring cells. The target cell may be a cell provided by an eNB of LTE or an AP of Wi-Fi.

Object number parameter: an object number parameter means the number of neighboring cells.

Power parameter: a power parameter means a threshold value for performing measurement. Since the terminal consumes power when performing the measurement, if a measurement value of a serving cell is not lower than the threshold value, the terminal may not measure a neighboring cell (or a target cell). In some embodiments, the power parameter may correspond to "s-measure" in the LTE communication system.

In operation 403, the terminal may measure a first quality of a first signal of the first RAT and a second quality of a second signal of the second RAT, based on configuration information. The terminal may measure a quality of the signal, based on parameters related to measurement, such as a period parameter, an interval parameter, or a measurement object parameter included in the configuration information. For example, the terminal may measure RSRP (a first quality) of a reference signal (the first signal) transmitted to an LTE network (the first RAT). In addition, the terminal may measure an RSRI (a second quality) of a beacon signal (the second signal) transmitted to a Wi-Fi network (the second RAT).

In operation 405, the terminal may determine whether to perform a handover to a second network node for the second RAT, based on the first quality or the second quality.

The terminal may identify an event parameter included in the configuration information. The event parameter may indicate at least one of a plurality of events. The terminal may configure an entering condition or a leaving condition required for each event. The terminal may determine whether an entering condition or a leaving condition for each event is fulfilled, based on the first quality or the second quality measured in operation 403.

Each of the plurality of events may be variously configured with different conditions. In some embodiments, the terminal may determine whether to trigger an event by using a parameter of the serving cell (hereinafter, referred to as a first event). The terminal may configure an entering condition such as the following equation through a first threshold value, a hysteresis value, and a measurement value for the serving cell. In one example, when the serving cell is an LTE network, the target cell may be a Wi-Fi network. In another example, when the serving cell is a Wi-Fi network, the target cell may be an LTE network.

$$Ms+Hys<\text{Thresold1} \qquad \text{Equation 1}$$

Ms refers to a measurement value in the serving cell. Hys refers to a hysteresis value. Threshold1 refers to a first threshold value of the first event. When the measurement value of the serving cell is smaller than a value obtained by subtracting the hysteresis value from the first threshold value (upper limit threshold value), the terminal may start to determine whether to perform a handover. Thereafter, when equation 1 is satisfied during the duration of a persistence parameter value included in the configuration information, the terminal may determine to perform a handover to a target cell. The target cell may be a cell which supports a different RAT from the serving cell.

In some other embodiments, the terminal may determine whether to trigger an event by using a parameter of the serving cell and a parameter of the neighboring cell (hereinafter, referred to as a second event). The terminal may configure an entering condition such as the following equation through a measurement value for the serving cell, an offset value, a hysteresis value, and a measurement value for the neighboring cell. In one example, when the serving cell is an LTE network, the target cell may be a Wi-Fi network. In another example, when the serving cell is a Wi-Fi network, the target cell may be an LTE network.

$$Mn-Hys>Ms+\text{Offset} \qquad \text{Equation 2}$$

Mn refers to a measurement value in the neighboring cell. Ms refers to a measurement value in the serving cell. Hys refers to a hysteresis value. Offset refers to an offset value of the second event. When equation 2 is satisfied, the terminal may start to determine whether to perform a handover. Thereafter, if the condition is satisfied during the duration of the persistence parameter value included in the configuration information, the terminal may determine to perform a handover to the target cell. As described above, the target cell may be a cell which supports a different RAT from the serving cell.

In some other embodiments, the terminal may determine whether to trigger an event by using a parameter of the neighboring cell (hereinafter, referred to as a third event). The terminal may configure an entering condition such as the following equation through a second threshold value, a hysteresis value, and a measurement value for the neighboring cell. In one example, when the serving cell is an LTE network, the target cell may be a Wi-Fi network. In another example, when the serving cell is a Wi-Fi network, the target cell may be an LTE network.

$$Mn-Hys>\text{Threshold2} \qquad \text{Equation 3}$$

Mn refers to a measurement value in the neighboring cell. Hys refers to a hysteresis value. Threshold2 refers to a second threshold value of the third event. When the measurement value of the neighboring cell is larger than a value obtained by subtracting the hysteresis value from the second threshold value (lower limit threshold value), the terminal may start to determine whether to perform a handover. Thereafter, when equation 3 is satisfied during the duration of the persistence parameter value included in the configuration information, the terminal may determine to perform a handover to the target cell (that is, the neighboring cell). The target cell may be a cell which supports a different RAT from the serving cell.

In some other embodiments, the terminal may determine whether to trigger an event by using a parameter of the serving cell and a parameter of the neighboring cell (hereinafter, referred to as a fourth event). The terminal may configure a first entering condition as shown in the following equation 4 through a third threshold value, a hysteresis value, and a measurement value for the serving cell, and a second entering condition as shown in the following equation 5 through a fourth threshold value, a hysteresis value, and a measurement value for the neighboring cell. In one example, when the serving cell is an LTE network, the target cell may be a Wi-Fi network. In another example, when the serving cell is a Wi-Fi network, the target cell may be an LTE network.

$$Ms+Hys<\text{Thresold3} \qquad \text{Equation 4}$$

$$Mn-Hys>\text{Threshold4} \qquad \text{Equation 5}$$

Ms refers to a measurement value in the serving cell. Mn refers to a measurement value in the neighboring cell. Hys refers to a hysteresis value. Threshold3 refers to a third threshold value of the fourth event, and Threshold4 refers to a fourth threshold value of the fourth event.

When both equations 3 and 4 are satisfied, the terminal may start to determine whether to perform a handover. Thereafter, during the duration corresponding to the persistence parameter value included in the configuration information, when the first entering condition and the second entering condition are satisfied, the terminal may determine to perform a handover to the target cell (that is, the neighboring cell). As described above, the target cell may be a cell which supports a different RAT from the serving cell.

Although the above four conditions are described in the disclosure, the disclosure is not limited thereto. The four conditions described above are merely examples for the events and are not limited thereto. Meanwhile, in some embodiments, threshold values, hysteresis values, or offset values for the events may be differently configured for each event.

In FIG. 4, when the terminal determines whether to perform a handover to the neighboring cell in operation 405, the terminal may perform the handover through signaling with the neighboring cell, that is, the target cell. For example, the terminal may perform a handover according to a configuration corresponding to each event through parameters received for the handover between LTE and Wi-Fi.

Figure 5:
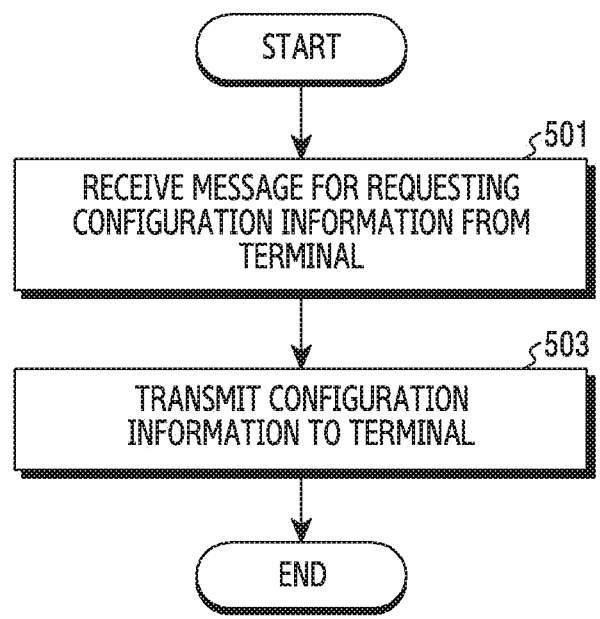
FIG. 5 illustrates an operation flow of a network node for performing a handover according to various embodiments of the disclosure.

FIG. 5 illustrates an operation flow of a network node for performing a handover according to various embodiments of the disclosure. FIG. 5 illustrates an operation method of the first network node 120 or the second network node 130.

Referring to FIG. 5, in operation 501, the network node may receive, from a terminal, a message for requesting configuration information. For example, a network node on an LTE network may receive, from the terminal, the message for requesting the configuration information through an RRC message. The RRC message may include an information element (IE) for requesting an inter-LTE-Wi-Fi handover-related parameter. The terminal may use a user datagram protocol (UDP) port allocated exclusively for requesting configuration information. For another example, a network node on a wireless LAN may receive the message for requesting the configuration information from the terminal through a multi-action frame. The action frame may include information for requesting the inter-LTE-Wi-Fi handover-related parameter by using a field allocated for a service provider (vendor).

In operation 503, the network node may transmit configuration information to the terminal. The network node may provide configuration information including the inter-LTE-Wi-Fi handover-related parameter to the terminal, in response to the message of operation 501. Specifically, the terminal determines whether the received message is the message for requesting the configuration information, and if the message is the message for requesting the configuration information, the network node transmits the configuration information to the terminal. However, when the message is not the message for requesting the configuration information, the terminal transfers the message to a higher network node (e.g., a node (e.g., serving gateway (S-GW) or packet data network gateway (P-GW)) on a general packet radio service (GPRS) tunneling protocol (GTP) of an LTE communication system) in order to process the message.

In FIGS. 4 and 5, embodiments in which the terminal receives parameters (configuration information) for a handover between heterogeneous RATs have been described. Hereinafter, in FIGS. 6 to 9, operations of the terminal and the network node for requesting the configuration information are described through specific examples.

Hereinafter, a first handover (a network node supporting a wireless LAN in a network node supporting a cellular network), for example, an LTE to Wi-Fi (L2 W) handover, which is a handover from LTE to Wi-Fi, is described with reference to FIGS. 6 and 7.

L2 W Handover

Figure 6:
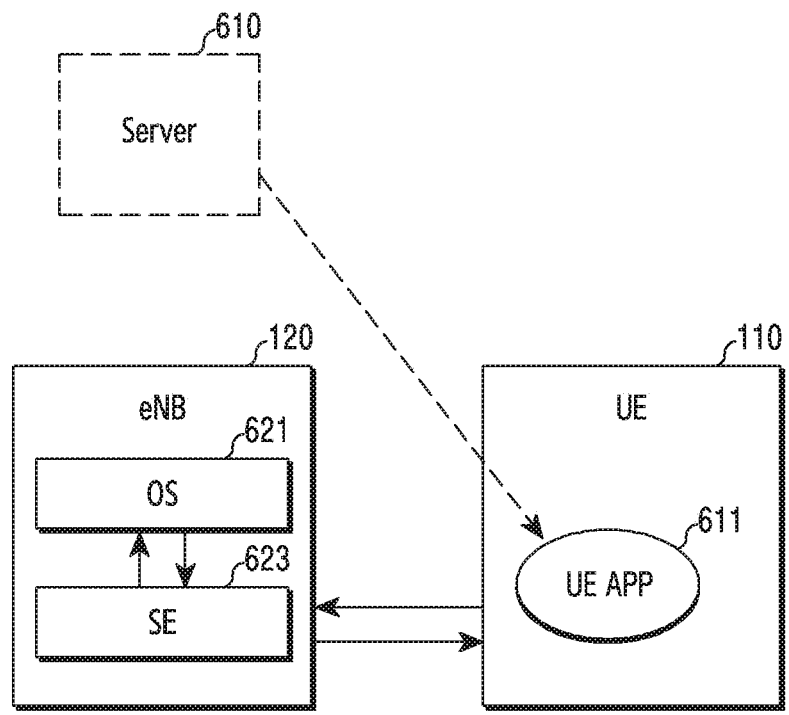
FIG. 6 illustrates an example of an interworking architecture of a network node and a terminal for performing a first handover according to various embodiments of the disclosure.

FIG. 6 illustrates an example of an interworking architecture between a network node and a terminal for performing a first handover according to various embodiments of the disclosure. The network node is a network node supporting a cellular network and, hereinafter, is described by using an eNB of LTE as an example. The terminal is referred to as a UE, as an example. In FIG. 6, the UE may be an example of the terminal 110 of FIG. 1 and the eNB may be an example of the first network node 120.

Referring to FIG. 6, a server 610 may provide an internet protocol (IP) of the eNB 120 to the UE 110. For example, the IP may be provided in a scheme of IP version 4 (IPv4) or IP version 6 (IPv6). The UE 110 may receive an IP address of the eNB 120 through an application 611.

The UE 110 may obtain a fully qualified domain name (FQDN) of the server 610 through the application 611. The UE 110 may obtain the IP address of the eNB 120 and a UDP port number from the server 610. The UDP port number may be a number assigned to the UE 110 for a specific purpose.

The eNB 120 may include an operating system (OS) 621 and a simple executive (SE) 623. The OS 621 and SE 623 are elements classified according to functions or roles thereof, which are not necessarily classified according to hardware. The eNB 120 may determine to enable/disable a feature through the OS 621. The eNB 120 may provide a filter table for the OS 621. The eNB 120 may provide handover-related parameters through the OS 621. The eNB 120 may receive a packet (e.g., an IP packet) from the UE 110 through the SE 623. The eNB 120 may filter the packet received from the UE 110 through the SE 623. The eNB 120 may generate a packet to be provided to the UE 110 through the SE 623. The eNB 120 may transmit the packet to the UE 110 through the SE 623.

Figure 7:
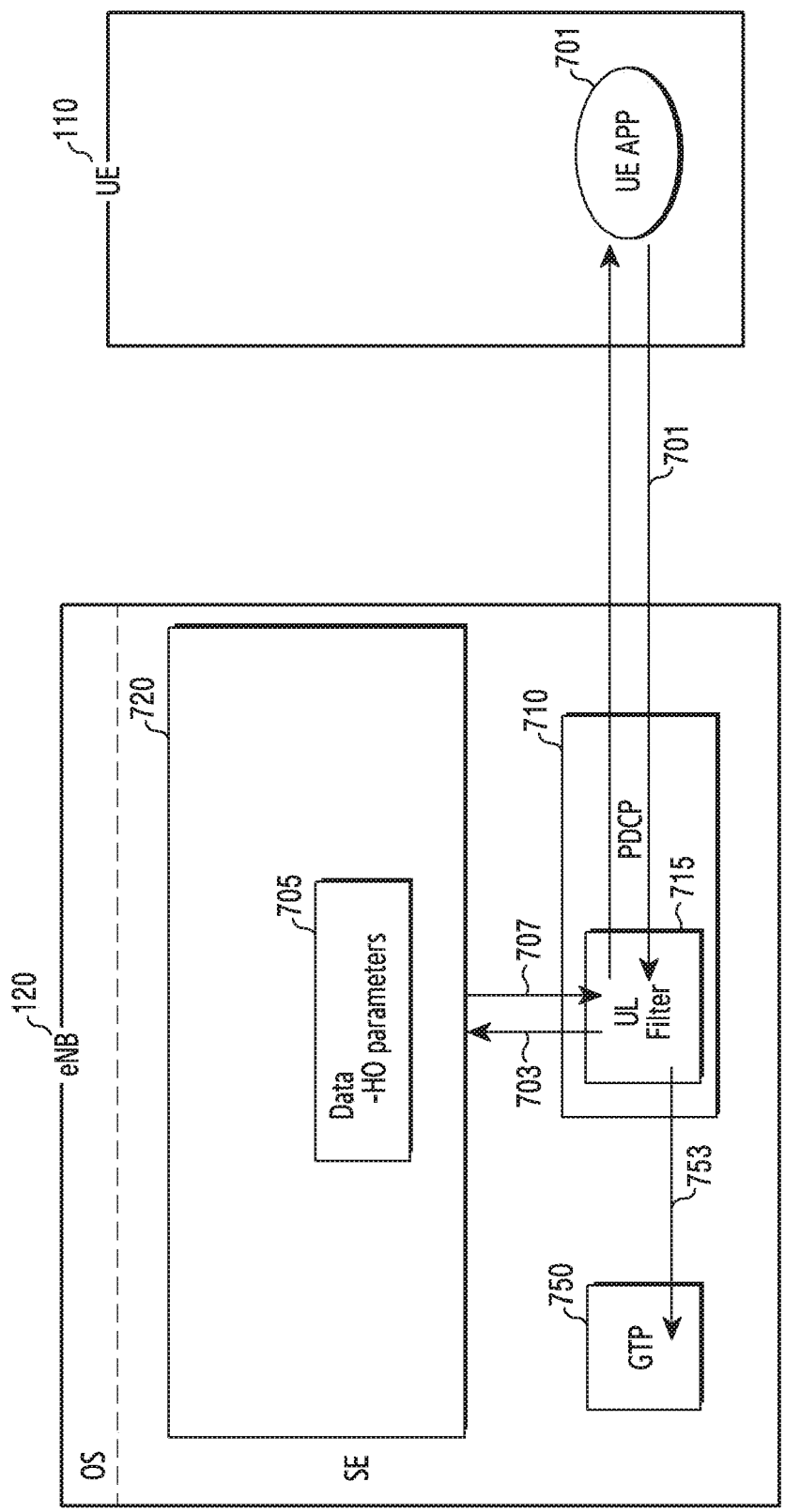
FIG. 7 illustrates signaling of a network node and a terminal for providing a parameter of a first handover according to various embodiments of the disclosure.

FIG. 7 illustrates signaling of a network node and a terminal for providing a parameter of a first handover according to various embodiments of the disclosure. As described above in FIG. 6, the network node is a network node supporting a cellular network and, hereinafter, is referred to as an eNB of LTE, and the terminal is referred to as a UE, as an example. In FIG. 7, the UE may be an example of the terminal 110 of FIG. 1 and the eNB may be an example of the first network node 120.

Referring to FIG. 7, in operation 701, the UE 110 requests the eNB 120 for an inter-LTE-Wi-Fi handover-related parameter (hereinafter, referred to as an LWHO parameter). The UE 110 may transmit, to the eNB 120, a message (or a packet) for requesting the LWHO parameter. The UE 110 may configure a UDP port number (e.g., 65529) and transmit the message to the eNB 120. The UDP port number may indicate a port allocated exclusively for the LWHO parameter.

In operation 703, the eNB 120 may receive a message on a packet data convergence protocol (PDCP) layer 710. The eNB 120 may determine whether the message is a message for requesting the LWHO parameter through a filter 715. The eNB 120 may determine whether the message is the message for requesting the LWHO parameter, based on a filter table information of the filter 715. The filter table information may include information on a destination IP address or a UDP port. For example, the eNB 120 may determine whether to request the LWHO parameter by identifying a UDP port number indicated by the message.

The eNB 120 may perform operation 703 when the message requests the LWHO parameter, and may perform operation 753 when the message does not request the LWHO parameter. The operation of determining whether to request the LWHO parameter may be referred to as a matching operation of normality identification.

In operation 703, when the normality identification of a packet for requesting the LWHO parameter is matched, that is, when the message requests the LWHO parameter, the eNB 120 may generate configuration information including LWHO parameters through a packet processor 720 in operation 705. For example, the eNB 120 may generate an IP packet by using the configuration information. A source address (src) of the generated IP packet may be an IP address of the eNB 120, a destination address (dst) of the IP packet may be an IP address of the UE 110, and a used protocol of the IP packet may be a UDP. A source port may be a UDP port allocated exclusively to the UE 110. That is, the source port number may be a port number configured for a LWHO parameter request. A destination port may be a source port recorded in a message transmitted by the UE 110. A data portion of the IP packet may include the above-described LWHO parameters (an event parameter, a hysteresis value, an offset value, a threshold value, a period parameter, an interval parameter, etc.).

In operation 707, the eNB 120 may provide the generated configuration information to the UE 110. Accordingly, the UE 110 may obtain the LWHO parameters from the eNB 120. At this time, the configuration information may be transmitted to the same QoS class identifier (QCI) as QoS on a bearer configured in the UE 110.

Meanwhile, in operation 703, when the normality identification of the packet for requesting the LWHO parameter is not matched, that is, when the message is not the message for requesting the LWHO parameter, in operation 753, the eNB 120 may maintain an existing operation such as general uplink data processing. For example, the eNB 120 transfers the message to a GTP 750. The eNB 120 provides the message to the GTP 750 to process the same in a core network through an upper node. The message may be provided to the core network through a network node such as a P-GW and an S-GW connected to the eNB 120 through the GTP 750.

As described above, when the UE 110 accesses the LTE communication system, that is, when the UE is RRC-connected to the eNB 120, the UE 110 may receive configuration information including the LWHO parameter from the eNB 120. When the eNB 110 identifies an adjacent AP (not shown) through a scan procedure, the UE 110 does not immediately attempt to connect with the AP, but may determine whether to perform a handover, based on at least one of a quality of a signal (e.g., a reference signal (RS)) provided from the eNB 120 and a quality of a signal (a beacon signal) provided from the AP. Therefore, when the strength of the signal provided from the AP is weak, the UE is not connected to the AP, so that an unnecessary handover can be prevented. In addition, an unnecessary handover to the Wi-Fi network is prevented, and thus the UE 110 may continuously receive a service in a state in which quality of service (QoS) is guaranteed. For example, the service may be a streaming service provided through the Internet. As another example, the service may be a voice service such as voice over LTE (VoLTE).

In FIGS. 6 and 7, the first handover has been described. Hereinafter, a second handover (a network node supporting a cellular network in a network node supporting a wireless LAN), for example, a Wi-Fi to LTE (W2L) handover, which is a handover from Wi-Fi to LTE, is described with reference to FIGS. 8 and 9.

W2L Handover

Figure 8:
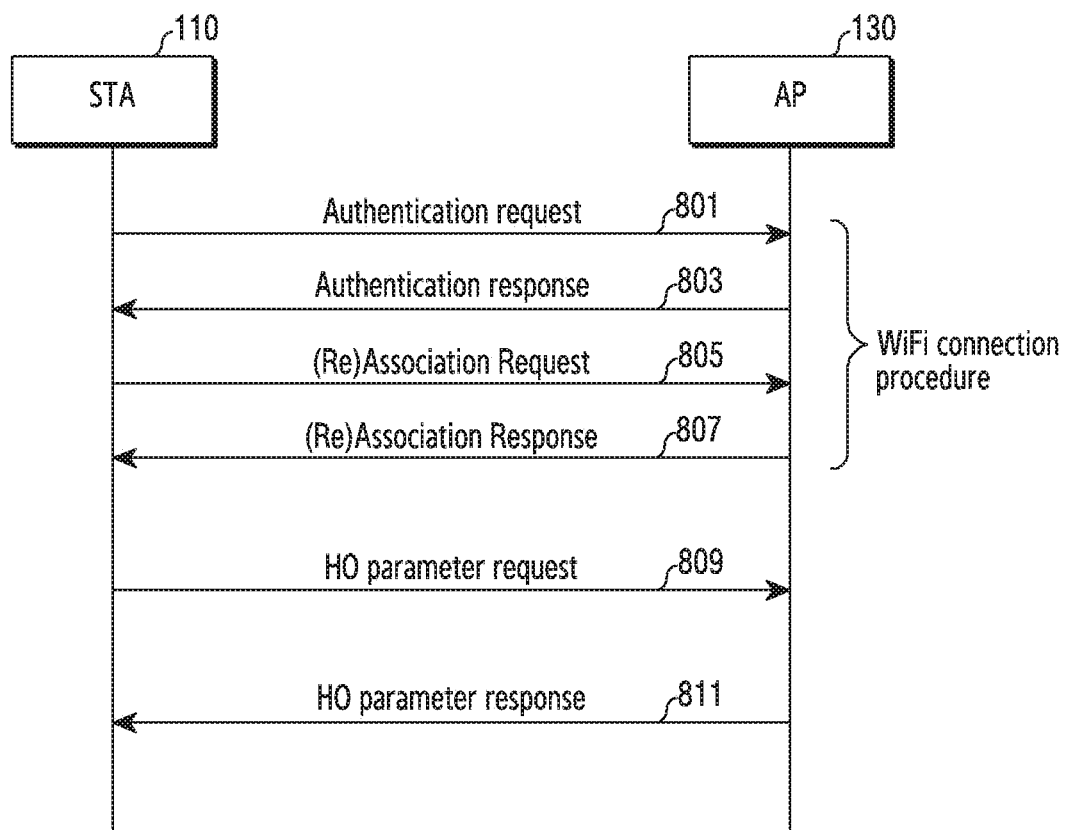
FIG. 8 illustrates signaling of a network node and a terminal for a parameter of a second handover according to various embodiments of the disclosure.

FIG. 8 illustrates signaling of a network node and a terminal for a parameter of a second handover according to various embodiments of the disclosure. The network node is a network node supporting a wireless LAN, and hereinafter, is described by using an AP of Wi-Fi as an example. The terminal is referred to as an STA, as an example. In FIG. 8, the STA may be an example of the terminal 110 of FIG. 1 and the AP may be an example of the second network node 130.

Although not shown in FIG. 8, in some embodiments, the STA 110 may initiate a connection procedure with the AP 130 by receiving a beacon signal transmitted from the AP 130 in a passive scan scheme. In some other embodiments, the STA 110 may initiate a connection procedure with the AP 130 through transmission of a probe request and a probe response in an active scan manner.

Referring to FIG. 8, in operation 801, the STA 110 may transmit an authentication request message to the AP 130. The STA 110 may search other APs in addition to the AP 130, and the STA 110 may select a channel having a strong reception strength. In this case, an AP of the selected channel may be the AP 130. The STA 110 may transmit the authentication request message to the AP 130. In operation 803, the AP 130 may transmit an authentication response message to the STA 110.

In operation 805, when an authentication procedure is performed, that is, when the authentication response message is received, the STA 110 may transmit a connection request message to the AP 130. In operation 807, the AP 130 may transmit a connection request response to the STA 110. Through operations 801 to 807, a connection between the STA 110 and the AP 130 may be configured.

In operation 809, the STA 110 may transmit, to the AP 130, a message for requesting a parameter. The parameter is a parameter relating to a handover between Wi-Fi and LTE and may be an LWHO parameter of FIGS. 6 and 7. After the STA 110 is connected to the AP 130, the STA 110 may transmit the message for requesting the parameter in order to determine whether to perform a handover when scanning the eNB.

In operation 811, the AP 130 may identify a request matter of the message after receiving the message from the STA 110. Particularly, the AP 130 may determine whether a request for an LWHO parameter of the STA 110 is valid. After the AP 130 identifies control information (e.g., IE) in the request message of the STA 110, the AP 130 may transmit configuration information including LWHO parameters to the AP 130 when it is determined that the request for the LWHO parameter is valid.

In operations 809 and 811, an action frame, which is a MAC frame defined in IEEE 802.11, may be utilized as signaling between the AP and the STA. Hereinafter, specific contents of the information transmitted in operations 809 to 811 is described with reference to FIG. 9.

Figure 9:
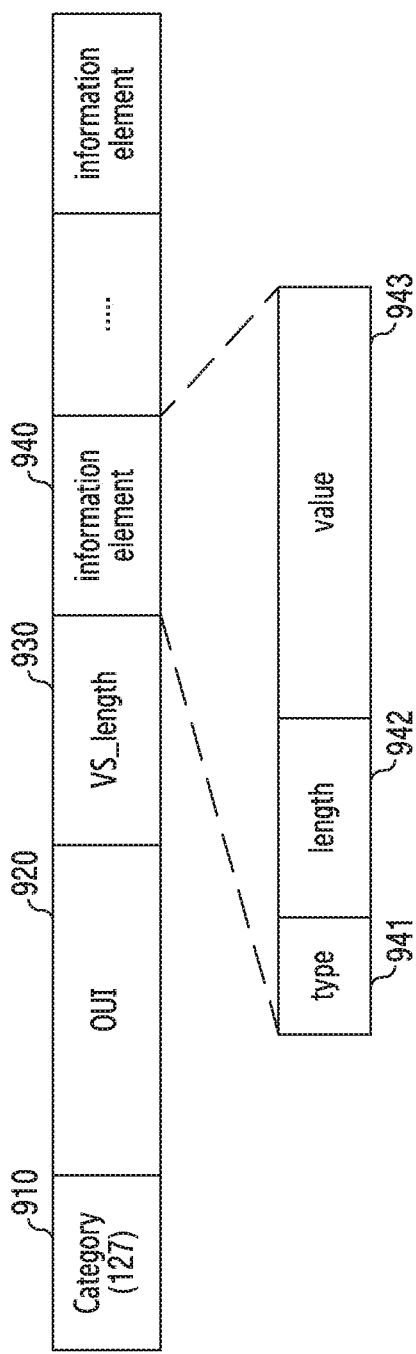
FIG. 9 illustrates an example of a frame for a parameter of a second handover according to various embodiments of the disclosure.

FIG. 9 illustrates an example of a frame for a parameter of a second handover according to various embodiments of the disclosure. The frame may be an action frame. As described above in FIG. 8, the STA 110 transmits request information when accessing the AP 130. The request information may refer to an IE. For example, the IE may be an LWHO Setup Req IE. The STA 110 may include the IE in the action frame and provide the request information to the AP 130.

The AP 130 may receive the request information from the STA 110. The AP 130 may transmit an LWHO parameter to the STA 110 on a service cell provided to the STA 110. The LWHO parameter may be a value optimally configured in the service cell of the AP 130. The LWHO parameter may be configured to have an optimal value for each event for a handover. In other words, a set of LWHO parameters of different values may be defined for each event.

Referring to FIG. 9, the action frame used for signaling between the STA 110 and the AP 130 may include a category code 910, an organizationally unique identifier (OUI) field 920, and an additional field in a frame body. The additional field may be a field allocated for a vendor.

In some embodiments, the STA 110 and the AP 130 may use a vendor specific action frame among action frames. The category code 910 may be configured to 127 for vendor utilization. The OUI field 920 may be configured to a specific value assigned to each vendor in the Institute of Electrical and Electronics Engineers (IEEE) Advanced Information Networking and Applications (AINA). For example, the OUI may use 00-00-FO or 00-12-FB. Meanwhile, in some other embodiments, the STA 110 and the AP 130 may use an action frame defined separately for the LWHO parameter. Hereinafter, a structure of the action frame is described based on the vendor specific action frame.

A "Vendor Specific Content," which is a field area allocated for a vendor, may include signaling messages of a wireless LAN handover improvement method. A VS length field 930 may indicate the total length of information elements (IEs) (e.g., IE 940) included in the "Vendor Specific Content" field. The IE may include a type field 941 indicating the type of the IE, a length field 942 indicating a length of the IE, and an information field 943 indicating a value of the IE.

When the STA 110 requests an inter-Wi-Fi-LTE handover-related parameter from the AP 130, the IE may be an IE for requesting configuration for a handover. For example, the IE may be the above-described LWHO Setup Req IE. Meanwhile, when the AP 130 provides an LWHO parameter to the STA 110 at the request of the STA 110, the information field 943 may include a hysteresis value, an offset value, a threshold value, a trigger parameter, and the like as LWHO parameters.

As described above, when the STA 110 is connected to a wireless LAN, that is, when the STA 110 is in association with the AP 130, the STA 110 may receive configuration information including the LWHO parameter from the AP 130. Then, when the STA 110 identifies an adjacent eNB (not shown) through synchronization acquisition and random access procedures, the STA 110 does not immediately attempt to connect with the eNB, but may determine whether to perform a handover, based on at least one of a quality of a signal (e.g., a reference signal (RS)) provided from the eNB and a quality of a signal (e.g., a beacon signal) provided from AP 130. The STA 110 may determine whether to perform a handover by considering not only a quality with the AP 130 but also a channel quality with the eNB, so as to continuously receive a service in a state where QoS is guaranteed. For example, the service may be a streaming service provided through the Internet. As another example, the service may be a voice service such as Voice over Wi-Fi (VoWiFi).

As described with reference to FIGS. 4 to 9, parameters related to a handover between a cellular network and a wireless LAN are transferred, so that a quality of an application in service can be maintained and thus an optimal wireless communication environment can be provided. In addition, in terms of service provision, it is possible to provide more robustness in comparison to the existing handover scheme.

The disclosure has mainly described a handover from LTE to Wi-Fi or a handover from Wi-Fi to LTE, as an example. In this case, a network node which provides a Wi-Fi service, that is, an AP may refer to an AP which is not connected to the existing LTE network. In other words, the handover may include not only a handover in a situation where an interworking between LTE and Wi-Fi is premised (e.g., evolved packet data gateway (ePDG) or LTE Wi-Fi aggregation (LWA)), but also a handover in a situation where the interworking between the LTE and the Wi-Fi is not premised, that is, a handover between an AP and an eNB operated by a vendor of the LTE communication system and another vendor or individual.

Meanwhile, the disclosure has been described based on a case of a handover to another network node in a state where a terminal is connected to a network node, as an example, but can be identically applied to a case of reselection of a cell in an idle mode also. In other words, when the terminal is connected to an LTE eNB and then enters the idle mode, the terminal may wake up from the idle mode and reselect an adjacent AP. In this case, the terminal may determine whether to connect to the AP through LWHO parameters received before entering the idle mode.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within an electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device for performing the embodiments of the disclosure via an external port. Further, a separate storage device on the communication network may access the device for performing the embodiments of the disclosure.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
   receiving configuration information from a first network node for a first radio access technology (RAT);
   measuring a first quality for a first signal of the first RAT and a second quality for a second signal of a second RAT, based on the received configuration information; and
   determining whether to perform a handover to a second network node for the second RAT or not, based on at least one of the first quality or the second quality,
   wherein the configuration information includes at least one parameter for a handover between the first RAT and the second RAT,
   wherein the configuration information is received with a quality of service class identifier (QCI) of a same quality of service (QoS) as a QoS on a bearer configured in the terminal, and
   wherein the at least one parameter comprises a time unit parameter for measuring the first quality and the second quality.

2. The method as claimed in claim 1, wherein the first RAT provides a cellular network, and the second RAT provides a wireless local area network (WLAN).

3. The method as claimed in claim 1,
   wherein the first RAT provides a wireless local area network (WLAN), and
   wherein the second RAT provides a cellular network.

4. The method as claimed in claim 3, further comprising:
   transmitting, to the first network node, an action frame for requesting the configuration information,
   wherein the action frame comprises an information element (IE) indicating requesting the at least one parameter for the handover.

5. The method as claimed in claim 4, wherein the configuration information is transmitted to the terminal through a vendor specific content field of the action frame.

6. The method as claimed in claim 1, wherein the at least one parameter further comprises:
   a trigger parameter indicating a metric for the first quality or the second quality;
   a persistence parameter indicating a duration in which a specific condition for the first quality or the second quality is required to be maintained, for the handover to the second network node;
   a hysteresis value for a handover according to the specific condition;
   an offset value for the handover according to the specific condition;
   at least one threshold value for the specific condition; and
   measurement parameters related to measurement of the first quality or the second quality.

7. The method as claimed in claim 6, wherein the specific condition is at least one of a plurality of conditions for the first quality or the second quality, and the at least one threshold value is differently configured for each of the plurality of conditions.

8. The method as claimed in claim 6, wherein the measurement parameters comprise at least one of a parameter related to a measurement interval or a parameter related to a number of measurements.

9. The method as claimed in claim 1,
   wherein the determining of whether to perform the handover to the second network node comprises determining to perform the handover to the second network node when a first condition for the first quality and the second quality is satisfied for a predetermined duration, and
   wherein the at least one parameter for the handover comprises a parameter indicating the predetermined duration.

10. A device of a network node in a wireless communication system, the device comprising:
    at least one transceiver; and
    at least one processor operably coupled with the at least one transceiver,
    wherein the at least one processor is configured to:
       control the at least one transceiver to receive a message for requesting configuration information from a terminal connected to the network node, and
       control the at least one transceiver to transmit the configuration information including at least one parameters for a handover between a first radio access technology (RAT) for the network node and a second RAT for another network node,
    wherein the first RAT provides a wireless local area network (WLAN),
    wherein the second RAT provides a cellular network,
    wherein the configuration information is transmitted with a quality of service class identifier (QCI) of a same quality of service (QoS) as a QoS on a bearer configured in the terminal, and
    wherein the at least one parameter comprises a time unit parameter for measuring a first quality for a first signal of the first RAT and a second quality for a second signal of the second RAT.

11. A terminal in a wireless communication system, the terminal comprising:
    at least one transceiver; and
    at least one processor operably coupled with the at least one transceiver,
    wherein the at least one processor is configured to:
       control the at least one transceiver to receive configuration information from a first network node for a first radio access technology (RAT),
       measure a first quality for a first signal of the first RAT and a second quality for a second signal of a second RAT, based on the received configuration information, and
       determine whether to perform a handover to a second network node for the second RAT or not, based on at least one of the first quality or the second quality, and
    wherein the configuration information includes at least one parameter for a handover between the first RAT and the second RAT,
    wherein the configuration information is received with a quality of service class identifier (QCI) of a same quality of service (QoS) as a QoS on a bearer configured in the terminal, and wherein the at least one parameter comprises a time unit parameter for measuring the first quality and the second quality.

12. The terminal of claim 11, wherein the first RAT provides a cellular network, and
wherein the second RAT provides a wireless local area network (WLAN).

13. The terminal of claim 11, wherein the first RAT provides a wireless local area network (WLAN), and
wherein the second RAT provides a cellular network.

14. The terminal of claim 13, wherein the at least one processor is further configured to:
control the at least one transceiver to transmit, to the first network node, an action frame for requesting the configuration information, and
wherein the action frame comprises an information element (IE) indicating requesting the at least one parameter for the handover.

15. The terminal of claim 14, wherein the configuration information is transmitted to the terminal through a vendor specific content field of the action frame.

16. The terminal of claim 11, wherein the at least one parameter further comprises:
a trigger parameter indicating a metric for the first quality or the second quality;
a persistence parameter indicating a duration in which a specific condition for the first quality or the second quality is required to be maintained, for the handover to the second network node;
a hysteresis value for the handover according to the specific condition;
an offset value for the handover according to the specific condition;
at least one threshold value for the specific condition; and
measurement parameters related to measurement of the first quality or the second quality.

17. The terminal of claim 16, wherein the specific condition is at least one of a plurality of conditions for the first quality or the second quality, and
wherein the at least one threshold value is differently configured for each of the plurality of conditions.

18. The terminal of claim 16, wherein the measurement parameters comprise at least one of a parameter related to a measurement interval or parameters related to a number of measurements.

19. The terminal of claim 11, wherein the at least one processor is further configured to:
establish a connection with the first network node; and
request the configuration information from the first network node.

20. The terminal of claim 11, wherein the at least one processor is, to determine whether to perform the handover to the second network node, configured to:
determine to perform the handover to the second network node when a first condition for the first quality and the second quality is satisfied for a predetermined duration, and
wherein the at least one parameter for the handover further comprises a parameter indicating the predetermined duration.

\* \* \* \* \*